Jan. 12, 1960    J. A. JACKSON    2,921,298
THRUST-BEARING WEAR MEASURING APPARATUS
Filed Oct. 31, 1956    2 Sheets-Sheet 2
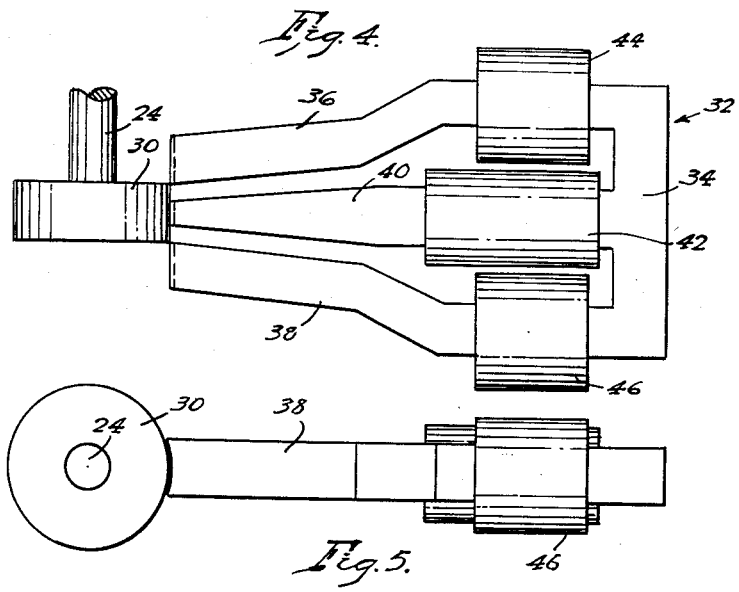
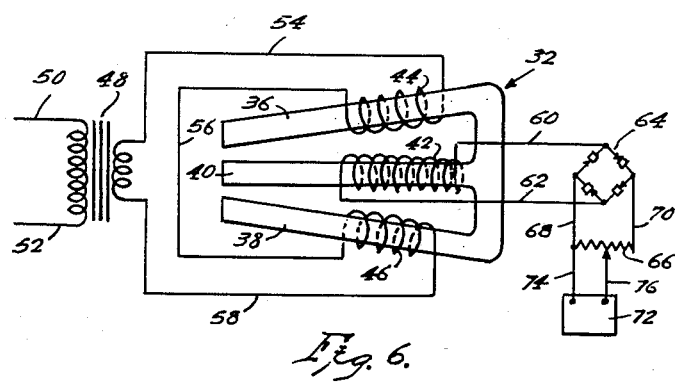
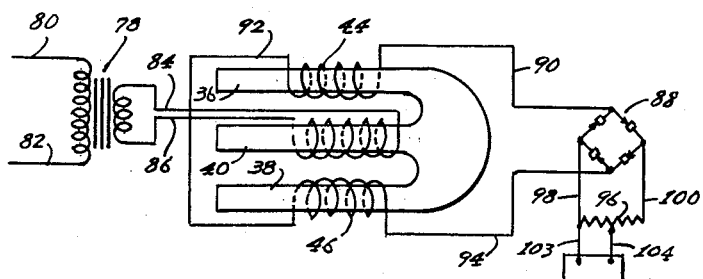
INVENTOR.
Jesse A. Jackson.
BY
ATTORNEY.

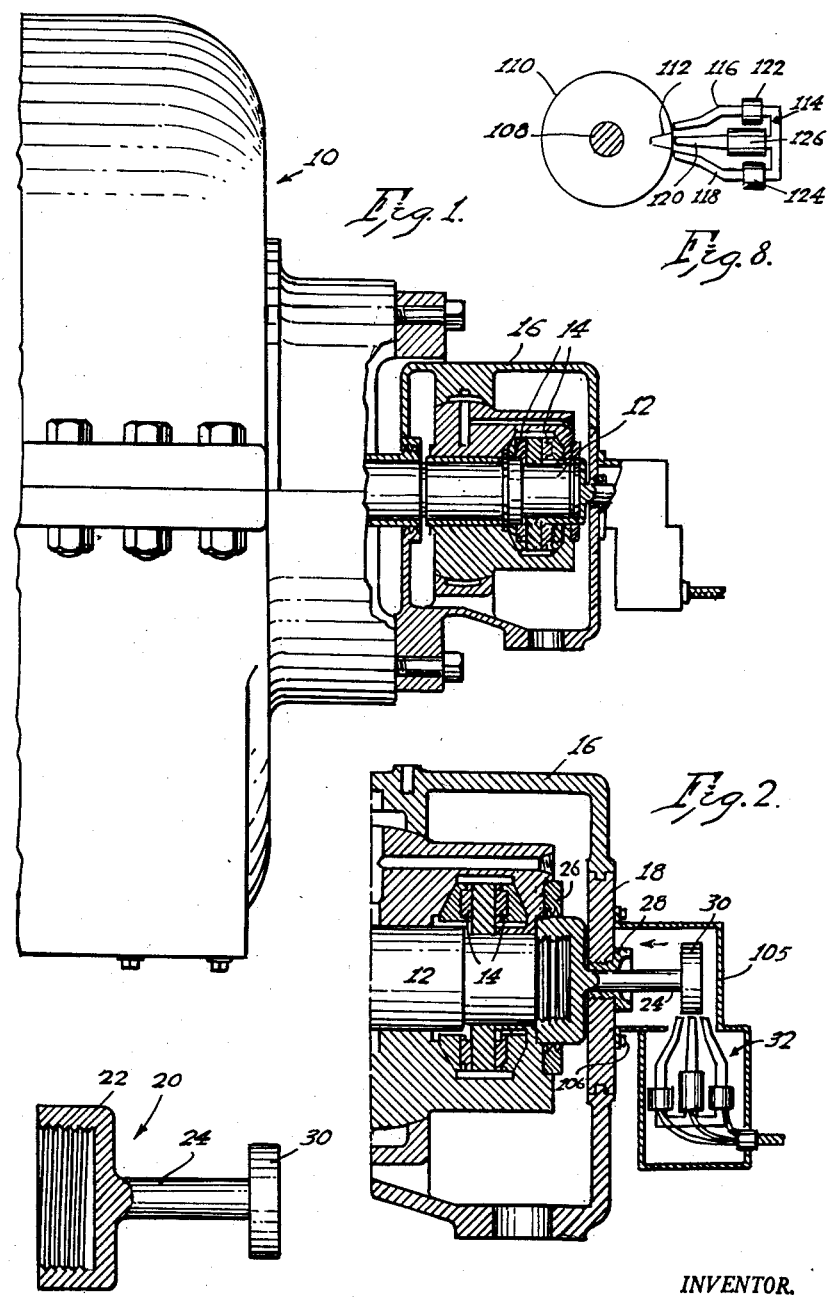

United States Patent Office 2,921,298
Patented Jan. 12, 1960

2,921,298

THRUST-BEARING WEAR MEASURING APPARATUS

Jesse A. Jackson, Port Arthur, Tex., assignor to Gulf Oil Corporation, Pittsburgh, Pa., a corporation of Pennsylvania Application October 31, 1956, Serial No. 619,521

1 Claim. (Cl. 340—199)

The present invention relates to apparatus for sensing minute displacement, either curvilinear or rectilinear. More specifically, the present invention pertains to apparatus for sensing either curvilinear displacement or rectilinear displacement by means of measuring or indicating the value of a quantity that is a function of the magnetic reluctance of a magnetic circuit wherein the magnetic reluctance of the circuit is a function of the displacement being sensed. The apparatus of the invention can sense rectilinear displacement of a body irrespective of whether such body is rotating about an axis parallel to the direction of the rectilinear displacement.

Broadly, one aspect of the subject invention comprises means for defining a magnetic circuit of variable reluctance comprising first and second relatively movable, magnetically permeable elements, means for defining a travel path of the first element relative to the second element in such a manner that the magnetic reluctance of the magnetic circuit is a function of the position of the first element along its travel path relative to the second element, means for subjecting the magnetic circuit to a constant alternating magnetomotive force, and means for sensing the magnitude of alternating magnetic flux in said magnetic circuit. The travel path of the first element relative to the second element can be either rectilinear or curvilinear. Furthermore, the first element can have an axis of symmetry such that rotation of the first element about said axis of symmetry will not cause a variation in the magnetic reluctance of the magnetic circuit.

Another aspect of the invention comprises means for defining a magnetic circuit of variable reluctance comprising first and second relatively movable, magnetically permeable elements, means for defining a travel path of the first element relative to the second element in such a manner that the magnetic reluctance of the magnetic circuit is a function of the position of the first element along its travel path relative to the second element, said second element being E-shaped and comprised of a web and a pair of outer legs and an intermediate leg with all of such legs being essentially perpendicular to the travel path of the first element. The relation is such that the relative magnetic reluctance of a path that includes the first element, the intermediate leg and one of the outer legs of the second element with respect to the reluctance of a path that includes the intermediate leg, the first element and the other of the outer legs is a function of the position of the first element along its travel path. Means are included for sensing the relative reluctance of the aforementioned two paths with respect to each other as an indication of the position of the first element along its travel path.

Such means for measuring the relative magnetic reluctance of the two paths can take either of two preferred forms. The especially preferred one of which comprises means for establishing a constant alternating magnetomotive force in the intermediate leg of the second element and means for indicating or measuring the difference between the amount of alternating flux passing through the two outer legs of the second element. The alternatively preferred arrangement comprises means for producing equal and constant magnetomotive forces in the outer legs of the second element, and means for measuring the difference between the magnetic flux in the two outer legs comprising measurement of the magnetic flux in the intermediate leg.

These and other aspects of the invention will be more fully appreciated upon reference to the accompanying drawings illustrative of preferred embodiments of the invention taken together with the following description thereof.

In the drawings:

Figure 1 illustrates in part a centrifugal compressor, a portion of which is broken away and shown in section to show the shaft thereof and the means by which the apparatus of the invention is applied to measure axial translation of the shaft;

Figure 2 is an enlarged detail sectional view of the right-hand portion of Figure 1;

Figure 3 is an enlarged elevational view, partly in section, of the movable element of the magnetic circuit and the means by which the same is attached to the shaft of the compressor of Figure 1;

Figure 4 is an enlarged elevational view of the magnetic circuit and the coils associated therewith;

Figure 5 is a side or plan view of the apparatus shown in Figure 4;

Figure 6 is a schematic diagram of the electrical circuitry employed in the conjunction with the magnetic circuit;

Figure 7 is a schematic diagram of electrical circuitry that may be used in lieu of that shown in Figure 6; and Figure 8 is an alternative arrangement of the magnetic circuit for sensing minute angular displacement.

Referring to Figure 1, the numeral 10 designates generally a large centrifugal compressor (only partly shown) of the type used for compressing large volumes of refinery gases during the production of ethylene. The compressor 10 includes a rotatable shaft 12 that is subjected to substantial axial forces during operation of the compressor 10. Thrust bearing means including thrust blocks 14 are provided for carrying axial loads imposed upon the shaft 12 during operation of the compressor 10.

As best shown in Figure 2, the thrust bearing means including the thrust blocks 14 and the adjacent end of the shaft 12 are provided with a housing 16 that includes an end wall 18. The structure thus far described is conventional, and it is to such a conventional structure that a preferred form of the invention is applied for the purpose of indicating axial displacement of the shaft 12 such as will occur in the course of operation of the compressor 10 due to wear of the thrust blocks 14. In a machine such as compressor 10, only a very small tolerance of thrust bearing wear is permissible; it is therefore essential that the condition of the thrust bearings be frequently ascertained. It is to this purpose that the application of a preferred embodiment of the invention is directed so that a continuous record of axial displacement of the shaft 12 can be obtained as an indication of the condition of the bearing means including the thrust blocks 14.

The end of the shaft 12 is threaded and a shaft extension member designated generally at 20 is secured to the shaft 12. The shaft extension member 20 is comprised of an internally threaded cup or cap 22 having an integral axial shaft extension 24 (see Figure 3). The cap 22 of the shaft extension member 20 is threaded upon the shaft 12, as best shown in Figure 2, with the outer cylindrical surface thereof being in sealing relation with a labyrinth sealing ring 26 mounted, as shown. The end wall 18 is modified to include a central opening in which a seal 28 is threaded. The shaft extension 24 extends outwardly from the housing 16 through the seal 28 in the end wall 18.

In the preferred construction, the cap 22 and the shaft 24 are fabricated from a nonmagnetic material, preferably a metal such as brass or bronze. To the outer end of the shaft extension 24 there is secured a collar or flange 30 of cylindrical configuration that is formed of a magnetically permeable material, such as a mild steel. The arrangement is such that the shaft extension 24 and the collar 30 are axially aligned with and are connected so as to rotate with the shaft 12. It is not essential that the cap 22 and the shaft 24 be made of nonmagnetic material, and where strength is important, such elements can be made of steel or the like as they will not greatly distort the magnetic fields presently to be described when the collar 30 is of substantially greater diameter than the shaft 24.

The collar 30 constitutes a part of magnetic circuit means of variable reluctance. Such magnetic circuit means are best shown in Figures 4 and 5 where the same will be seen to be comprised of the collar 30 on the shaft extension 24, and a generally E-shaped core designated generally at 32 that is comprised of a magnetically permeable material, such as used in transformer cores. Preferably, the core 32 is of laminated construction, such as are conventional transformer cores. The E-shaped core 32 is comprised of a web 34, outer legs 36 and 38, and an intermediate leg 40. The legs 36, 38 and 40 and the axis of the collar 30 are coplanar with each of such legs extending from the web 34 towards the collar 30 and being essentially perpendicular to the axis of the collar 30. As clearly shown in Figures 4 and 5, the legs 36, 38 and 40 terminate in closely spaced relation (preferably less than thirty thousandths of an inch) to the cylindrical surface defined by the outer surface of the collar 30 upon axial movement of the collar 30. In the preferred construction, the axial thickness of the collar 30 is approximately equal to the spacing between the adjacent edges of the extremities of the outer legs 36 and 38, as shown in Figure 4, though of course the collar 30 can be of greater or lesser axial thickness, as will be understood.

The E-shaped core 32 is symmetrical about a medial plane through the intermediate leg 40, and it will therefore be evident that when the collar 30 is in the position shown thereof in Figure 4, the magnetic reluctance of a magnetic circuit that includes intermediate leg 40, the collar 30, the outer leg 36, and the portion of the web intermediate the legs 36 and 40 will be equal to the magnetic reluctance of the magnetic circuit that includes the intermediate leg 40, the collar 30, the outer leg 38, and the portion of the web 44 intermediate the legs 38 and 40. Also, it will be evident that when the collar 30 is displaced upwardly from the position shown thereof in Figure 4, the magnetic reluctance of the first-described magnetic circuit will be decreased, while the magnetic reluctance of the second-described circuit will be increased. Conversely, in the event the collar 30 is displaced downwardly from the position shown thereof in Figure 4, the magnetic reluctance of the first-described magnetic circuit will be increased while that of the other magnetic circuit will be decreased. In other words, the magnetic reluctance of each of the described magnetic circuits is a function of the position of the collar 30 along its axial travel path. Also, the difference between the magnetic reluctances of the two magnetic circuits is a function of the position of the collar 30.

Electrical means are employed for sensing or measuring any unbalance between the values of the reluctances of the two described magnetic circuits and also for recording such measured unbalance. It will be apparent that such measurement will afford an indication as to the magnitude of any displacement of the collar 30 from what may be called the illustrated neutral position thereof in Figure 4.

Such electrical means includes a coil 42 wound upon the intermediate leg 40 and coils 44 and 46 wound upon the outer legs 36 and 38, respectively. The coils 44 and 46 each have the same number of turns. In Figure 6, there is schematically illustrated one form of electrical circuitry that can be associated with the coils 42, 44 and 46. Such electrical circuitry comprises a transformer 48, the primary of which is connected to a source of alternating electrical current by leads 50 and 52. The secondary of the transformer 48 is connected by means of leads 54, 56 and 58 in series with the coils 44 and 48, as shown, whereby the outer leg portions of each of the two described magnetic circuits can be subjected to identical alternating magnetomotive forces. It will be noted that the series arrangement of the coils 44 and 46 is such that with current flowing in one direction through the electrical circuit, the outer extremities of the legs 36 and 38 will be of unlike magnetic polarity.

The coil 42 on the intermediate leg 40 is connected by electrical leads 60 and 62 to a full-wave rectifier 64. The direct current output terminals of the full-wave rectifier 64 are connected in series with a resistor 66 by electrical leads 68 and 70. One terminal of a conventional potential or current recorder 72 that records current versus time is connected to the lead 68 by a lead 74, while the other terminal of the recorder 72 is adjustably tapped to the resistor 66 by a lead 76.

The operation of the apparatus when using the electrical circuity shown in Figure 6 will be readily understood. When the collar 30 is in the neutral position shown thereof in Figure 4, there is no magnetic flux passing through the intermediate leg 40 of the E-shaped core 32 and consequently no voltage is induced in the coil 42 so that the recorder 72 records a zero value. However, when the collar 30 is displaced axially in either direction from its neutral position and thereby causing an unbalance between the magnetic reluctances of the circuits that respectively include the outer legs 36 and 38, an alternating magnetic flux in the intermediate leg 40 will result. Such alternating magnetic flux in the intermediate leg 40 will be of a magnitude that is a function of the unbalance between the reluctances; such reluctance unbalance being in turn a function of the extent of the displacement of the collar 30 from its neutral position. The alternating magnetic flux in the intermediate leg 40 will induce an alternating voltage in the coil 42 having a magnitude that is a function of the magnitude of the magnetic flux in the intermediate leg 40. The recorder 72 will then record a current value having a magnitude dependent upon the magnitude of the alternating voltage induced in the coil 42, thus furnishing a continuous record of the displacement of the collar 30 from its neutral position.

Referring now to the electrical circuity illustrated schematically in Figure 7, there is provided a transformer 78, the primary of which is connected to a source of alternating current by means of leads 80 and 82. The secondary of the transformer 78 is connected in series with the coil 42 by leads 84 and 86, whereby the intermediate leg 40 is subjected to a constant alternating magnetomotive force. The coils 44 and 46 are connected in series with each other and with a full-wave rectifier 88 by means of leads 90, 92 and 94. Also in this embodiment of the invention, the coils 44 and 46 are so wound upon the legs 36 and 38 that current flowing in one direction through the series circuit of the coils 44 and 46 will induce unlike magnetic polarities at the extremities of the legs 36 and 38.

The direct current output terminals of the full-wave rectifier 88 are connected in series with a resistor 96 by leads 98 and 100. One terminal of a recorder 102 of the type that continuously records current versus time is connected to the lead 98 by a lead 103, while the other terminal of the recorder 102 is adjustably tapped to the resistor 96 by a lead 104.

The operation of the apparatus when employing the electrical circuity shown in Figure 7 will be readily appreciated. The coil 42 subjects the intermediate leg 40 to a constant alternating magnetomotive force. When the collar 30 is in the neutral position shown in Figure 4, exactly half of the flux in the intermediate leg 40 passes through each of the legs 36 and 38 thereby inducing equal alternating potentials in the coils 44 and 46. Inasmuch as the series connection of the coils 44 and 46 is such that flow of current in one direction causes the outer extremities of the legs 36 and 38 to be of unlike polarity, and since the polarity of the outer extremities of the legs 36 and 38 will be of like polarity, the voltages induced in the coils 44 and 46 are equal and opposed so that the recorder 102 records a zero current value. However, whenever the collar 30 is axially displaced from its neutral position, the flux in the two legs 36 and 38 becomes unequal so that although the voltages induced in the coils 44 and 46 are opposed one will be of greater magnitude than the other so that there is a net flow of alternating current into the rectifier 88, the magnitude of such flow of current being recorded by the recorder 102. It will be clear that the magnitude of the value recorded by the recorder 102 will be a function of the extent that the collar is displaced from its neutral position.

Referring again to Figures 1 and 2, the E-shaped core 32 is positioned in the previously described spatial relation with respect to the collar 30, the same being supported by a housing 105 of nonmagnetic material such as brass or copper that encloses the core 32, the collar 30, and the shaft extension 24, as shown, with the housing 105 being secured to the end wall 18 by suitable fastening means 106.

The above-described embodiments of the invention can conveniently be so dimensioned as to be sensitive to axial movements of the shaft 12 of less than a few thousandths of an inch. It will be noted in connection with either of the above-described embodiments of the invention that the record produced by the recorder can be calibrated with respect to axial translation of the collar 30 from its neutral position. It will be noted further that the record produced for a given axial position of the collar 30 is substantially unaffected by changes in rotational velocity of the collar 30 about its axis. Therefore, a precise measurement of the axial position of the collar 30 and therefore of the shaft 12 can be obtained during operation of the compressor 10.

In view of the preceding, it will be readily appreciated that the principles of the invention can be applied to measure or indicate minute changes in angular position of a body. A preferred arrangement for measuring such angular departure is illustrated in Figure 8. Assuming that with respect to the shaft indicated by the numeral 108, it is desired to measure or indicate minute angular departures of the same from its normal position, a disc or collar 110 of nonmagnetic material, such as copper or brass, is suitably secured to the shaft 108 for rotation therewith. The collar 110 is provided with an insert 112 of magnetic material, such as mild steel. An E-shaped core 114 generally similar to the previously described core 32 is disposed so that the legs thereof are coplanar with the collar 110 in a plane perpendicular to the axis of the collar 110. As shown in Figure 8, the outer extremities of the legs 116, 118 and 120 of the core 114 terminate in closely spaced relation to the cylindrical surface of the collar 110 and its insert 112. The legs 116, 118 and 120 of the core 112 are provided respectively with coils 122, 124 and 126 that are identical, respectively, to the coils 44, 46 and 42 of the previously described embodiment of the invention. The coils 122, 124 and 126 are provided with electrical circuitry such as that shown in either Figure 6 or Figure 7 in the same manner as the corresponding coils of the previously described embodiments of the invention. The mode of operation of the embodiment of the invention shown in Figure 8 will be evident in the light of the preceding description of the other embodiments of the invention, it being noted that angular departure of the shaft 108 and its collar 110 from a neutral position wherein the magnetic insert 112 is disposed in a position symmetrical with respect to the outer legs 116 and 118 will result in an unbalance of the reluctances of the magnetic circuits in the core 114 associated respectively with the outer legs 116 and 118.

Those skilled in the art will recognize that, though preferred, the illustrated and described embodiments of the invention are only representative of numerous constructions that fall within the actual scope of the invention. Accordingly, attention is directed to the appended claim in order to ascertain the actual scope of the invention.

I claim:

In apparatus of the type including a rotatably mounted shaft that is subject to an axial thrust load, with thrust bearing means connected to the shaft for opposing the thrust load; the improvement comprising means in combination with such apparatus for sensing axial displacement of the shaft during rotation of the latter as occasioned by wear of the thrust bearing means, said means for sensing axial displacement comprising a shaft extension member secured to one end of the shaft for rotation therewith, said shaft extension member including a collar axially spaced from and coaxial with the shaft, said collar being magnetically permeable and having a circular periphery transverse to its central axis, a stationary E-shaped, magnetically permeable core comprising of a web, two outer legs and an intermediate leg, each of said legs being essentially perpendicular to and coplanar with the axis of the collar with the intermediate leg of the core extending from the web towards and terminating in closely spaced relation to the collar, said collar normally occupying an axial position such that the magnetic reluctance of the magnetic circuit that includes the intermediate leg, the collar, one of the outer legs and the web is equal to the corresponding magnetic circuit of the other outer leg, a first electric circuit comprising a series connected pair of coils respectively encircling the outer legs of the core, a second electric circuit comprising a coil encircling the intermediate leg of the core, with said coils being so constructed and arranged that an alternating current in one of said electric circuits will not induce an alternating potential in the other electric circuit when the body occupies its normal position, means for supplying an alternating current to one of said electric circuits, and means for indicating electrical potential induced in the other of said electric circuits.

References Cited in the file of this patent

UNITED STATES PATENTS

| | | |
|---|---|---|
| 2,365,593 | Rights et al. | Dec. 19, 1944 |
| 2,443,661 | Lenehan | June 22, 1948 |
| 2,508,370 | Bozoian | May 23, 1950 |
| 2,602,660 | Shannon | July 8, 1952 |
| 2,627,119 | Graham | Feb. 3, 1953 |